(12) United States Patent  (10) Patent No.: US 7,778,484 B2
Fu  (45) Date of Patent: Aug. 17, 2010

(54) METHOD AND APPARATUS FOR REDUCING NOISE IN AN IMAGE USING WAVELET DECOMPOSITION

(75) Inventor: Guoyi Fu, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 895 days.

(21) Appl. No.: 11/620,288

(22) Filed: Jan. 5, 2007

(65) Prior Publication Data

US 2008/0166064 A1    Jul. 10, 2008

(51) Int. Cl.
G06K 9/34 (2006.01)
G06K 9/36 (2006.01)
H04N 9/68 (2006.01)

(52) U.S. Cl. .................. 382/275; 382/240; 348/234

(58) Field of Classification Search .......... 382/162, 382/175, 240, 254, 274–276; 348/234, 390.1; 375/240.11, 240.19, 240.27; 708/317, 400–401
See application file for complete search history.

(56) References Cited

U.S. PATENT DOCUMENTS

| | | | | |
|---|---|---|---|---|
| 5,453,945 | A * | 9/1995 | Tucker et al. | 708/400 |
| 5,802,369 | A * | 9/1998 | Ganesh et al. | 709/247 |
| 5,953,388 | A * | 9/1999 | Walnut et al. | 378/4 |
| 6,163,619 | A | 12/2000 | Maruo | |
| 6,836,569 | B2 | 12/2004 | Le Pennec et al. | |
| 7,206,459 | B2 * | 4/2007 | Berkner et al. | 382/251 |
| 7,377,170 | B2 * | 5/2008 | Ganesan et al. | 73/587 |
| 7,391,915 | B1 * | 6/2008 | Sankaran | 382/248 |
| 7,397,957 | B2 * | 7/2008 | Kim et al. | 382/232 |
| 7,406,396 | B2 * | 7/2008 | Das et al. | 702/181 |
| 7,450,772 | B2 * | 11/2008 | Bottou et al. | 382/240 |
| 7,602,982 | B2 * | 10/2009 | Budge et al. | 382/239 |
| 2003/0095206 | A1 | 5/2003 | Wredenhagen et al. | |
| 2004/0008904 | A1 | 1/2004 | Lin et al. | |
| 2004/0260169 | A1 | 12/2004 | Sternnickel | |
| 2004/0268096 | A1 | 12/2004 | Master et al. | |
| 2005/0100241 | A1 | 5/2005 | Kong et al. | |
| 2005/0207660 | A1 | 9/2005 | Edgar | |
| 2005/0243205 | A1 | 11/2005 | Wredenhagen et al. | |
| 2005/0265633 | A1 | 12/2005 | Piacentino et al. | |
| 2005/0276515 | A1 | 12/2005 | Shekter | |

* cited by examiner

Primary Examiner—Kanji Patel

(57) ABSTRACT

A method of reducing noise in an image comprises decomposing the image to generate wavelet coefficients at different scales. The wavelet coefficients are then modified based on the energy of the wavelet coefficients at the different scales. The image is reconstructed based on the modified wavelet coefficients.

16 Claims, 12 Drawing Sheets

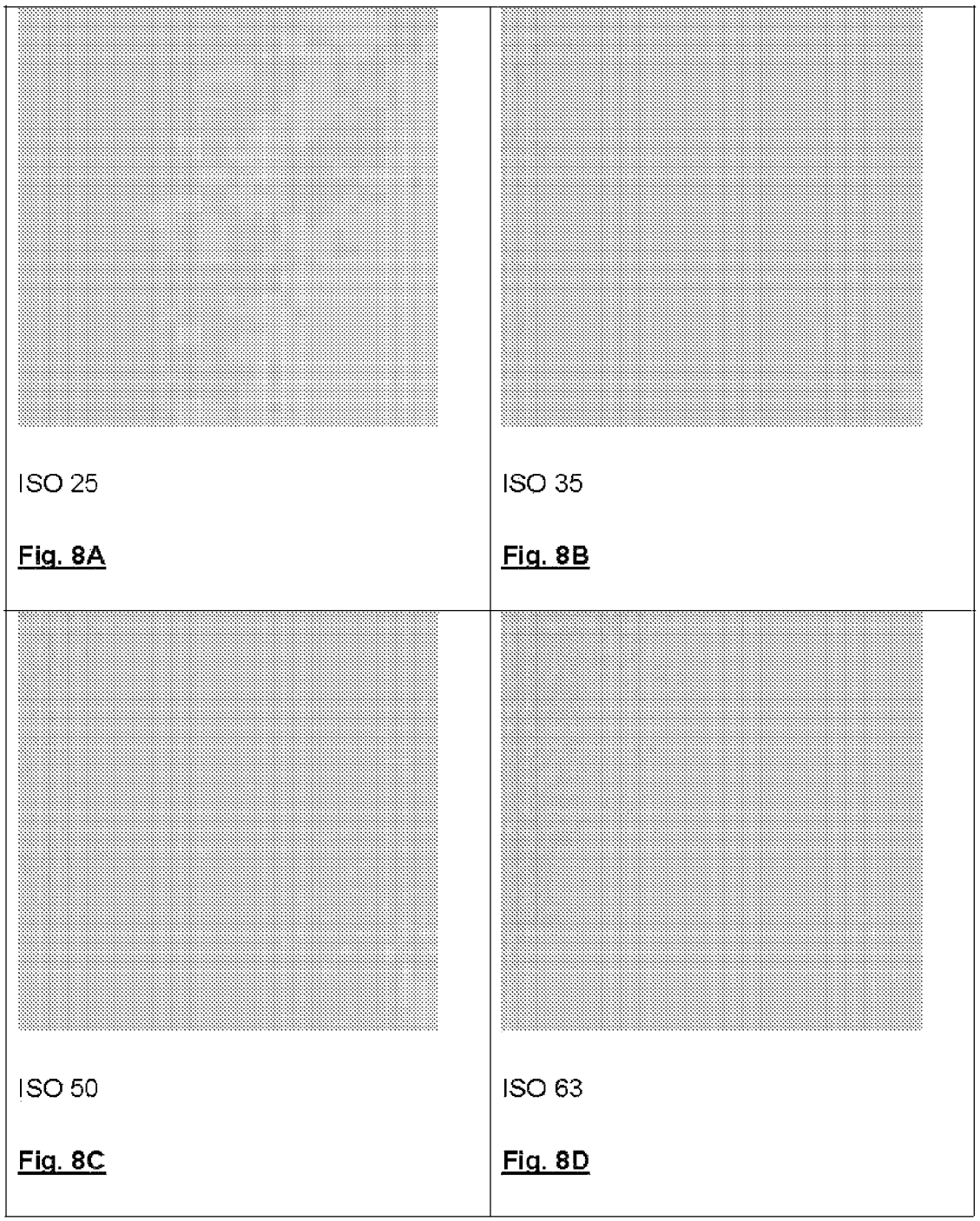

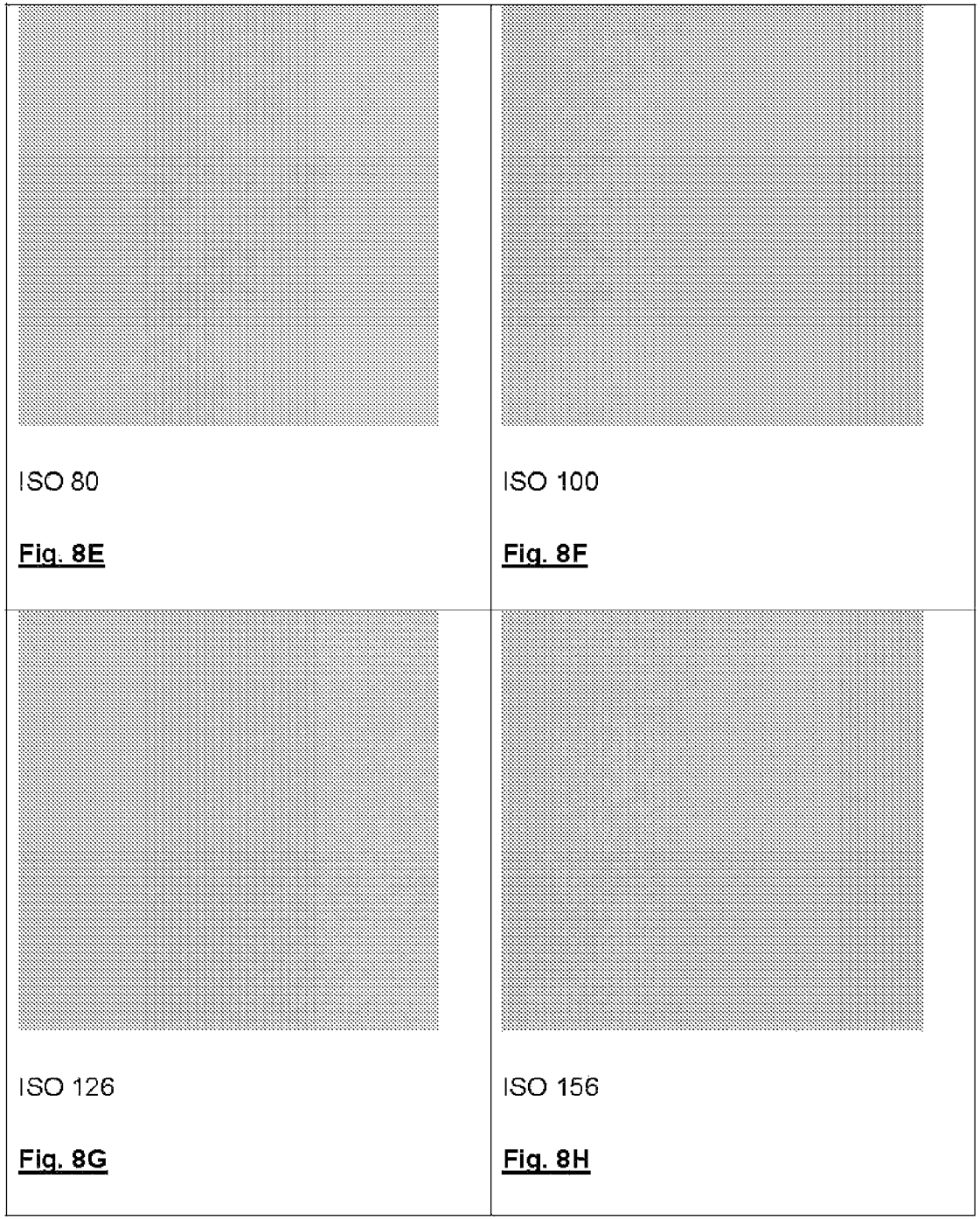

ISO 201

ISO 253

ISO 319

ISO 401

ISO 565

ISO 801

Original Image

Click on the centre of the 64x64 noise area which contains no details

METHOD AND APPARATUS FOR REDUCING NOISE IN AN IMAGE USING WAVELET DECOMPOSITION

FIELD OF THE INVENTION

The present invention relates generally to image processing and in particular, to a method, apparatus and computer-readable medium embodying a computer program for reducing noise in an image using wavelet decomposition.

BACKGROUND OF THE INVENTION

Digital cameras have an ISO rating identifying their level of sensitivity to light.

For most digital cameras, a default ISO 100 setting is normal although some digital cameras have default ISO settings as low as fifty (50). An exemplary digital camera board has an ISO range between fourteen (14) and nine-hundred and ten (910) and a default ISO 50 setting. In high-end digital, single-lens reflex (SLR) cameras, even higher ISO settings are available. For example, in some digital SLR cameras, the default ISO setting can be set to 200, 400, 800 or even 3200.

When increasing the ISO setting of a digital camera and hence, its sensitivity to light, the output of the digital camera sensor is amplified and so less light is needed during image capture. Unfortunately, undesired noise is also amplified resulting in more grainy pictures. Noise in general is introduced into images by both the digital camera sensor and the digital camera signal amplifier as a result of particular shooting conditions, image compression etc.

In examining noise in images captured by digital cameras at high ISO settings, it has been found that noise generally takes two forms, namely luminance noise and chromanoise. Luminance noise gives images a grainy look when presented on an electronic display screen but is usually not visible when the images are printed. Chromanoise appears as random red and blue pixels and is typically less visible in images both on-screen and when printed. Chromanoise is most visible in smooth and/or dark areas of images and is more visible in red (R) and blue (B) channels. Chromanoise in the red and blue channels tends to contain more low and very low frequency components due to demosaicing and interpolation. Chromanoise also adversely affects color saturation and contrast.

Many methods to remove noise from images have been considered. Some noise reduction methods, such as for example, anisotropic diffusion, assume that white noise has been added to images and compensate for image degradation on the basis of this assumption. Unfortunately, noise in images captured by digital cameras having high ISO settings is not accurately modeled by this noise assumption and thus, these noise reducing methods have proven to be unsatisfactory.

Wavelet methods for removing noise from images have gained in popularity. The Donoho-Johnstone method is a popular and efficient denoising method incorporating wavelets and makes use of soft or hard thresholds. During denoising of an image, the image is wavelet decomposed to generate wavelet coefficients representing the image detail. All of the wavelet coefficients below threshold levels are reduced to zero. Wavelet coefficients exceeding the threshold levels are either unmodified (hard) or reduced (soft). This method has proven to be most successful when the noise in the image generally conforms to expected Gaussian white noise. Unfortunately, this method requires the arbitrary a priori selection of the threshold levels. As a result, depending on the selected threshold levels, if the noise is not white noise, detail in the image may be lost, an insufficient amount of noise may be removed from the image or the noise may be improperly removed from the image.

Other more sophisticated noise reducing algorithms have been considered but these noise reducing algorithms are expensive in terms of processing time. Many of these methods, similar to the anisotropic diffusion method referred to above, incorporate assumed noise models and thus, unsuccessfully address noise when the noise does not accurately fit within the noise models.

Still other techniques for reducing noise in images have been considered. For example, U.S. Pat. No. 6,163,619 to Maruo discloses a method in which an input digital image of an object is subjected to a Wavelet transform. An image energy quantity for a combined area of X-axis high pass information and Y-axis high pass information contained in the image data resulting from the Wavelet transform, is calculated. The object is deemed acceptable or faulty depending on whether the image energy quantity is below or above a given value.

U.S. Pat. No. 6,836,569 to Le Pennac et al. discloses a method and apparatus for processing an n-dimensional digitized signal using foveal processing, which constructs a sparse signal representation by taking advantage of the geometrical regularity of signal structures. Foveal coefficients are computed with one-dimensional inner products along trajectories of an n-directional trajectory list. A trajectory finder computes the n-directional trajectory list from the input n-dimensional signals, in order to choose optimal locations to compute the foveal coefficients. From the foveal coefficients, a foveal reconstruction processor recovers a signal approximation which has the same geometrical structures as the input signal along the trajectories and which is regular away from the trajectories. A foveal residue can be calculated as a difference with the input signal. A bandlet processor decorrelates the foveal coefficients by applying invertible linear operators along each trajectory. Bandlet coefficients are inner products between the signal and n-dimensional bandlet vectors elongated along the trajectories. A geometric processor computes geometric coefficients by decorrelating the coordinates of the trajectories with linear operators, to take advantage of their geometrical regularity. Setting small bandlet coefficients and small geometric coefficients to zero yields the sparse signal representation.

U.S. Patent Application Publication No. 2003/0095206 to Wredenhagen et al. discloses a method for reducing noise in an image. During the method, a plurality of pixels along a predetermined contour is compared with a plurality of predefined patterns. The patterns represent visually significant patterns possible along the contour. A filter is selected from a predefined set of filters in accordance with the results of the comparison.

U.S. Patent Application Publication No. 2004/0008904 to Lin et al. discloses a process for removing noise in an image by wavelet thresholding utilizing a discrete wavelet transform that decomposes the image into different resolution levels. A thresholding function is then applied in different resolution levels with different threshold values to eliminate insignificant wavelet coefficients which mainly correspond to noise in the image. An inverse discrete wavelet transform is applied to generate a noise-reduced image. The threshold values are based on the relationships between the noise standard deviations at different decomposition levels in the wavelet domain and the noise standard deviation of the image.

U.S. Patent Application Publication No. 2004/0260169 to Sternnickel discloses a two-part method for non-linear denoising (NLD) of magneto cardiograph or electrocardiograph time series signals by performing local projections in the reconstructed state space using a wavelet transform to identify and describe deterministic structures. Subspaces generated by deterministic processes are located and separated independently of their sources.

U.S. Patent Application Publication No. 2004/0268096 to Master et al. discloses a digital imaging apparatus such as a digital camera, scanner, printer or dry copier having an optical sensor, an analog-to-digital converter, a plurality of computational elements, and an interconnection network. The optical sensor converts an object image into a detected image, which is then converted to digital image information by the analog-to-digital converter. The plurality of computational elements comprises a first computational element having a first fixed architecture and a second computational element having a second, different fixed architecture. The interconnection network is capable of providing a processed digital image from the digital image information by configuring and reconfiguring the computational elements in order to perform a plurality of different imaging functions.

U.S. Patent Application Publication No. 2005/0100237 to Kong et al. discloses a method of filtering pixels in an image, by first partitioning the image into blocks. Edge blocks are then identified. A variance of intensity for each pixel in each edge block is subsequently determined. Each pixel in each edge block is then filtered with a filter that is dependant on the intensity variance of the pixel.

U.S. Patent Application Publication No. 2005/40100241 to Kong et al. discloses a method for reducing artefacts in an input image. A variance image is generated from the input image. The input image is partitioned into a plurality of blocks of pixels. A set of classifications is defined and includes smooth, texture, and edge classes. A particular class is assigned to each block of pixels of the input image according to the variance image thereby to generate smooth blocks, texture blocks, and edge blocks. A fuzzy filter is applied to each pixel of each edge block.

U.S. Patent Application Publication No. 2005/0207660 to Edgar discloses a method for removing artefacts to restore a block of data. During the method, one or more original transform coefficients of the data block are received and the original transform coefficients of the data block are quantized. An artefact reduction process is applied to the quantized original transform coefficients and one or more quantized data values representing the transform coefficients as altered by the artefact reduction process is adjusted, if necessary. The artefact reduction process is reapplied and the quantized data values are readjusted, enabling restoration of the block of data.

U.S. Patent Application Publication No. 2005/0265633 to Piacentino et al. discloses a video processor that uses a low latency pyramid processing technique for fusing images from multiple sensors. The images from the multiple sensors are enhanced, warped into alignment, and then fused with one another in a manner that enables the fusing to occur within a single frame of video, i.e., sub-frame processing. The sub-frame processing results in a sub-frame delay between the moment of image capture and subsequent fused image display.

U.S. Patent Application Publication No. 2005/0276515 to Shekter discloses an apparatus for analyzing the broadband noise content of a digital image. The apparatus comprises means for automatically identifying regions of originally constant color in the image by analyzing the variance of pixel values of regions of the image. The apparatus further comprises means for automatically detecting and discarding constant color regions deemed to be unrepresentative of the true noise content of the image, including under-exposed and over-exposed regions. Selected constant color regions are then analyzed to generate a parametric or non-parametric model of the noise in the image, including frequency characteristics within and between channels and other characteristics such as phase, which might describe structured noise.

Although image noise reducing techniques are available, improvements are desired. It is therefore an object of the present invention to provide a novel method, apparatus and computer-readable medium embodying a computer program for reducing noise in an image using wavelet decomposition.

SUMMARY OF THE INVENTION

Accordingly, in one aspect there is provided a method of reducing noise in an image comprising:

decomposing the image to generate wavelet coefficients at different scales;

modifying the wavelet coefficients based on the energy of the wavelet coefficients at said different scales; and reconstructing the image based on the modified wavelet coefficients.

In one embodiment, the modifying is based on normalized inter-scale energy, single scale energy and weighted average single scale energy of the wavelet coefficients. The image is decomposed into wavelet detail spaces at different scales with each wavelet detail space comprising a plurality of wavelet detail subbands and each wavelet detail subband comprising a matrix of wavelet coefficients. The modifying may further be based on an adjustable parameter. The parameter may be manually adjustable and/or may be based on a function of an image capture device.

The decomposing, modifying and reconstructing may be performed automatically upon image capture or downstream following image capture.

The decomposing, modifying and reconstructing may be performed independently on one or more channels of the image. The one or more channels may comprise the Y channel of the image or the red and blue channels of the image.

According to another aspect there is provided an apparatus for reducing noise in an image comprising:

memory storing said image; and processing structure decomposing the image to generate wavelet coefficients at different scales, modifying the wavelet coefficients based on the energy of the wavelet coefficients at the different scales and reconstructing the image based on the modified wavelet coefficients.

According to yet another aspect there is provided a computer readable medium embodying a computer program for reducing noise in an image, said computer program comprising:

computer program code for decomposing the image to generate wavelet coefficients at different scales;

computer program code for modifying the wavelet coefficients based on the energy of the wavelet coefficients at different scales; and computer program code for reconstructing the image based on the modified wavelet coefficients.

BRIEF DESCRIPTION OF THE DRAWINGS

Embodiments will now be described more fully with reference to the accompanying drawings in which.

DETAILED DESCRIPTION OF THE EMBODIMENTS

Figure 1:
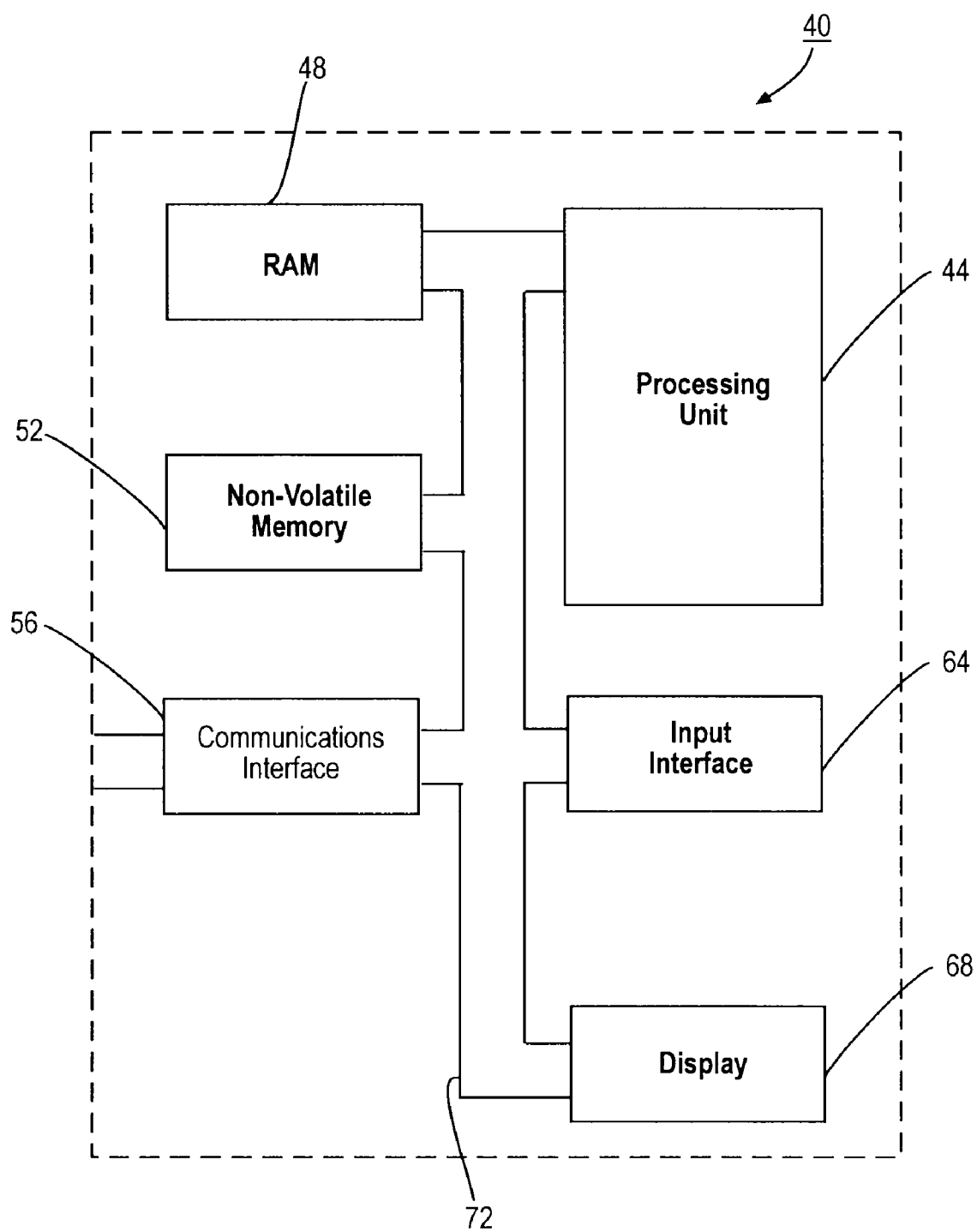
FIG. 1 is an apparatus for reducing noise in an image using wavelet decomposition.

Turning now to FIG. 1, an apparatus for reducing noise in an image using wavelet decomposition is shown and is generally identified by reference numeral 40. As can be seen, apparatus 40 comprises a processing unit 44, random access memory ("RAM") 48, non-volatile memory 52, a communication interface 56, a user interface 64 and a display 68, all in communication over a local bus 72. A noise reduction application is stored in the non-volatile memory 52. The noise reduction application is retrieved from the non-volatile memory 52, loaded into the RAM 48 and executed by the processing unit 44 when the apparatus 40 is used to process images to remove noise therein.

Figure 2:
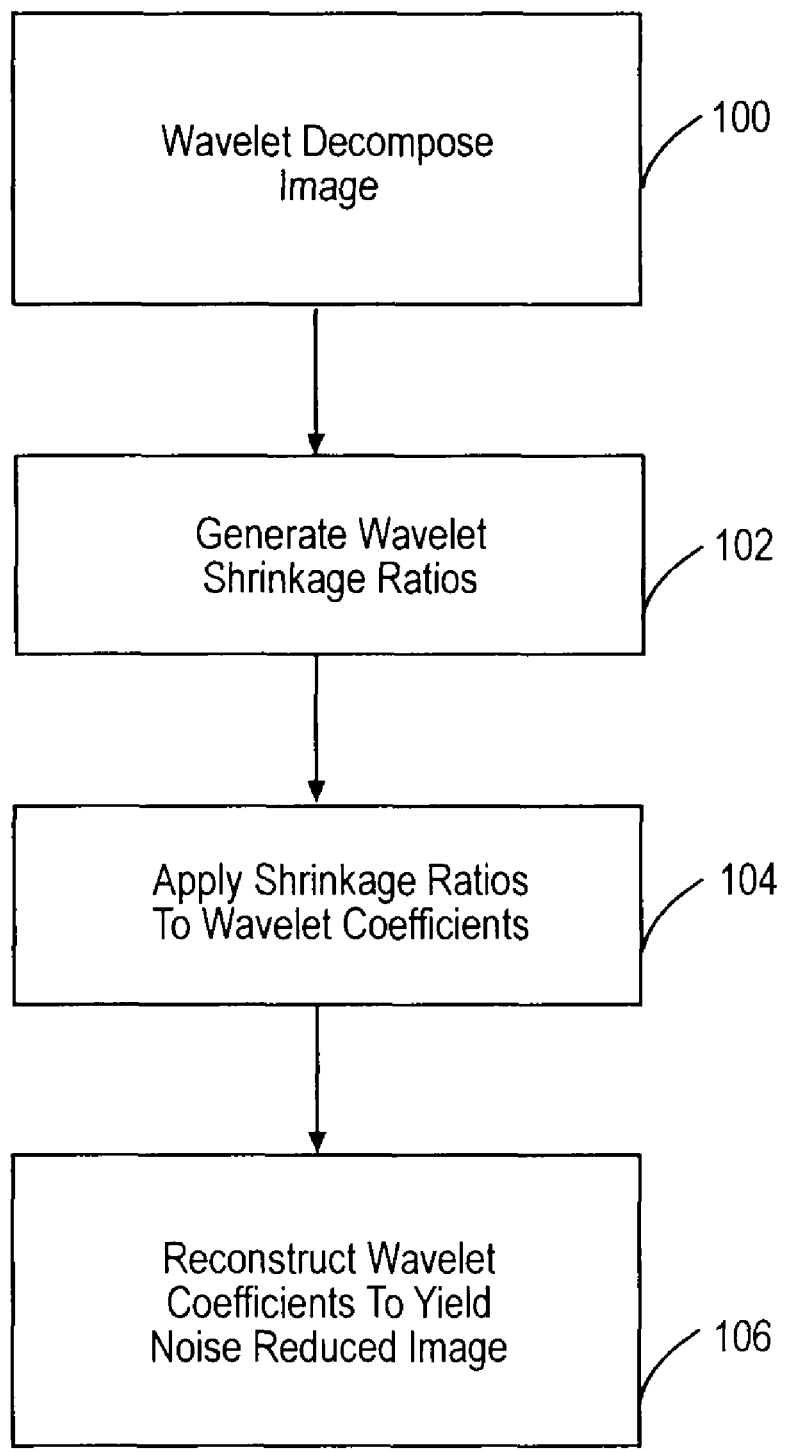
FIG. 2 is a flowchart showing the steps performed by the apparatus of FIG. 1 in order to reduce noise in an image during execution of a noise reducing application.

FIG. 2 is a flowchart showing the general method employed by the apparatus 40 in order to reduce noise in an image during execution of the noise reducing application. In this embodiment, the noise reduction application employs wavelet decomposition, wavelet coefficient modification and wavelet reconstruction during the image denoising process. Initially during processing of an image to remove noise, the image is wavelet decomposed using a Haar wavelet into wavelet detail spaces of different scales, with each wavelet detail space comprising a plurality of wavelet detail subbands (step 100). The wavelet detail subbands at each scale represent the details of the image at that scale. Each wavelet detail subband comprises a matrix of wavelet coefficients. Wavelet shrinkage ratios based on the energy feature space of the wavelet coefficients are then generated and normalized (step 102). The normalized wavelet shrinkage ratios are applied to the wavelet coefficients (step 104). By modifying the wavelet coefficients in this manner, noise in the image is suppressed without adversely effecting image details. The modified wavelet coefficients are then reconstructed thereby to yield the noise reduced image (step 106).

Further specifics of the above image denoising technique employed by the apparatus 40 during execution of the noise reducing application will be described. However before doing so, for ease of understanding, a brief discussion of wavelets will firstly be provided. As is well known, the wavelet transformation of an image allows the image to be viewed in multiple resolutions, with each resolution reflecting a different frequency. In digital signal processing terms, the wavelets function as high pass filters. During wavelet transformation of a signal x from u-space to t-space, wavelet coefficients W(j,t) are calculated according to Equation (1) below:

$$W(j, t) = \int_{-\infty}^{\infty} x(u) * \psi_j(t - u) du \qquad (1)$$

where:

j is a selected scale or level at time or location t; and $\psi_j$ is the wavelet at scale j.

In this example, wavelet $\psi_j$ is a Haar wavelet and is of the form:

$$\psi_j(x) = \begin{cases} 1 & -j \leq x < 0 \\ -1 & 0 \leq x < j \\ 0 & \text{otherwise} \end{cases}$$

Figure 3A:
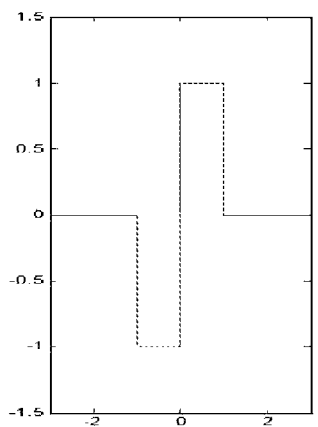
FIG. 3A shows a Haar wavelet at scale 1, time 0.
Figure 3B:
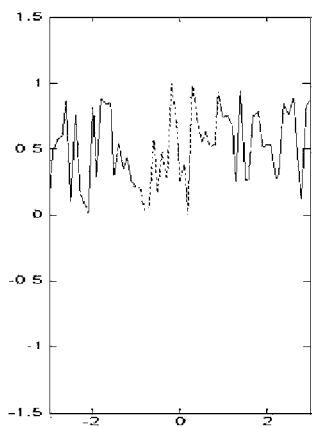
FIG. 3B shows a signal x(u)
Figure 3C:
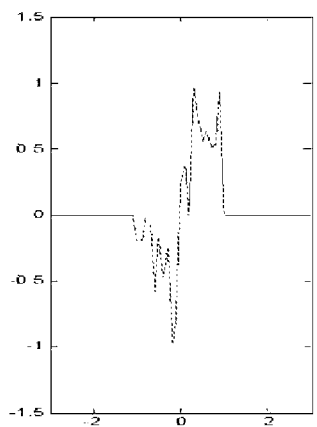
FIG. 3C shows the product of the Haar wavelet of FIG. 3A and the signal of FIG. 3B (i.e. the wavelet multiple signal or wavelet coefficient)
Figure 4A:
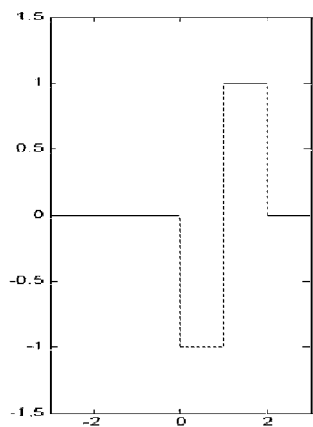
FIG. 4A shows the Haar wavelet at scale 2, time 0.
Figure 4B:
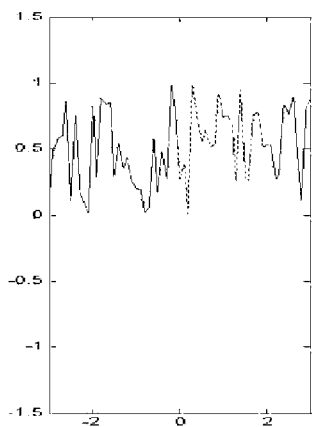
FIG. 4B shows the signal x(u)
Figure 4C:
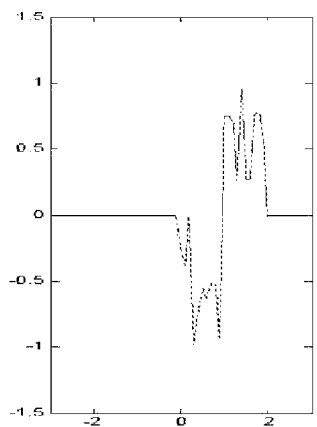
FIG. 4C shows the product of the Haar wavelet of FIG. 4A and the signal of FIG. 4B.
Figure 5A:
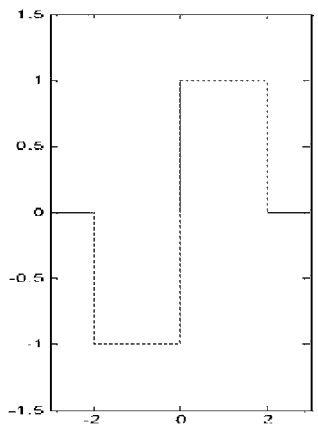
FIG. 5A shows the Haar wavelet at scale 1, time 1.
Figure 5B:
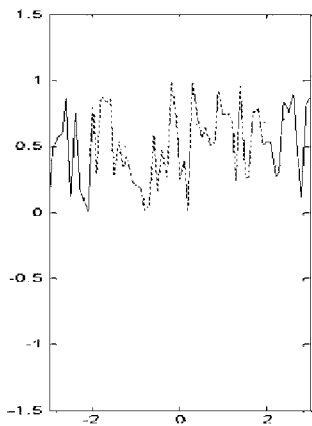
FIG. 5B shows the signal x(u)
Figure 5C:
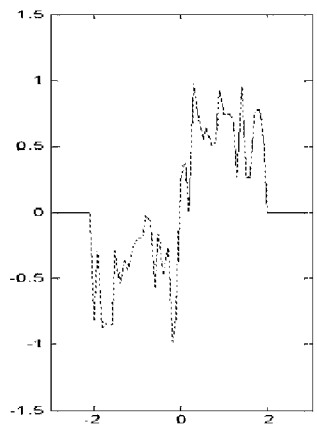
FIG. 5C shows the product of the Haar wavelet of FIG. 5A and the signal of FIG. 5B.

As is known, the Haar wavelet is orthonormal and can be used to define a Hilbert basis, that is, a complete orthonormal system for a Hilbert space of square integratable functions. FIGS. 3A to 3C show the calculation of wavelet coefficients at different scales and times for a signal x(u). In FIGS. 3A to 3C, the calculation of wavelet coefficient W(1, 0) is illustrated. FIG. 3A shows the Haar wavelet $\psi_j$ at scale 1, time 0. FIG. 3B shows the signal x(u). FIGS. 3C shows the wavelet multiple signal i.e. the product of Haar wavelet $\psi_j$ and signal x(u). FIGS. 4A to 4C show the calculation of wavelet coefficient W(1, 1). FIG. 4A shows the Haar wavelet $\psi_j$ at scale 1, time 1. FIG. 4B shows the signal x(u) and FIG. 4C shows the wavelet multiple signal. FIGS. 5A to 5C show the calculation of wavelet coefficient W(2, 0). FIG. 5A shows the Haar wavelet $\psi_j$ at scale 2, time 0. FIG. 5B shows the signal x(u) and FIG. 5C shows the wavelet multiple signal. As will be appreciated, at higher scales, the wavelet is stretched and as a result, wavelet coefficients exhibit stronger responses at lower frequency changes.

The wavelet transformation provides a framework for analyzing an image at multiple resolutions, in other words, at multiple scales and locations or times. Energy is preserved in wavelet coefficients according to Equation (2) below:

$$\|x\|^2 = \sum_{j=0}^{J_o} \|W_j\|^2 + \|V_{J_o}\|^2 \qquad (2)$$

where:

$W_j$ is the wavelet detail space at level or scale j;

$V_{J_o}$ is the approximation space at level $J_o$; and j=1, 2, . . . $J_o$.

Thus, for an image, wavelet detail space $W_j$ is equal to [$W_j$(x, y)], x=1 . . . N and y=1 . . . M where N and M are width and height of the wavelet detail subband at level j.

The preservation of energy in wavelet coefficients allows wavelet coefficients to be used to measure discontinuities in images. For example, the energy of wavelet coefficients associated with homogenous regions in images is close to zero.

The energy of wavelet coefficients associated with high transitional areas in images, such as for example edges (i.e. image detail), is however, very high.

Analyzing the energy of wavelet coefficients at different scales shows that the energy of noise in images and the energy of detail in images, behave differently at higher scales. Specifically, the energy of noise wavelet coefficients at higher scales decreases dramatically while the energy of image detail wavelet coefficients does not.

For example, consider signal e(x) to be white noise having a Gaussian distribution $N(0, \sigma^2)$. The wavelet coefficients of the white noise signal e(x) at scale j and time k are calculated according to Equation (3) below:

$$We(j,k) = \int_{-\infty}^{\infty} e(u) * \Psi_j(k-u) du \qquad (3)$$

where:

$\psi_j$ is the wavelet at scale j.

The energy We of the white noise wavelet coefficients is calculated according to Equation (4) below:

$$|We(j,k)|^2 = \int_{-\infty}^{\infty}\int_{-\infty}^{\infty} e(u) * \psi_j(k-u) * e(v) * \psi_j(k-v) du dv \qquad (4)$$

The expected value of the white noise wavelet coefficient energy is calculated according to Equation (5) below:

$$E\{|We(j,k)|^2\} = \int_{-\infty}^{\infty}\int_{-\infty}^{\infty} E\{e(u)e(v)\} * \psi_j(k-u) * \psi_j(k-v) du dv \qquad (5)$$

White noise has the following properties:

$$E\{e(u)e(v)\} = \sigma^2 * \delta(u-v) \qquad (6)$$

Substituting Equation (6) into Equation (5) yields:

$$\begin{aligned}E\{|We(j,k)|^2\} &= \int_{-\infty}^{\infty}\int_{-\infty}^{\infty} \sigma^2 * \delta(u-v) * \psi_j(k-u) * \psi_j(k-v) du dv \\ &= \sigma^2 \int_{-\infty}^{\infty} |\psi_j(k-u)|^2 du \\ &= \frac{\sigma^2 \|\psi\|^2}{2^{j-1}}\end{aligned} \qquad (7)$$

Figure 6:
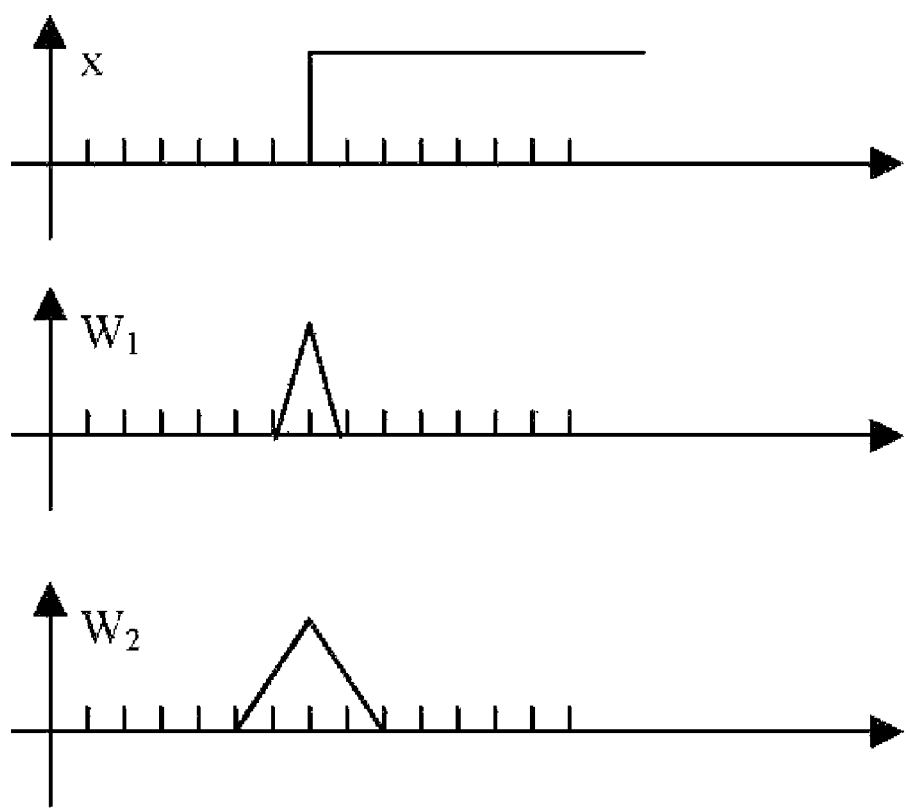
FIG. 6 shows a signal x representing a transitional area in an image and corresponding wavelet coefficients at different scales.

From Equation (7) above, it can be seen that the expected value of white noise wavelet coefficient energy drops by 50% at each successive higher scale. However, the energy of image detail wavelet coefficients does not decrease. For example, FIG. 6 shows a signal x representing a transitional area in an image, such as for example an edge, and corresponding wavelet coefficients $W_1$ and $W_2$ representing the edge at different scales. The energy of the wavelet coefficients $W_1$ and $W_2$ does not decrease at higher scales. The noise reducing technique employed by apparatus 40 makes use of this different wavelet coefficient energy behavior to reduce effectively noise in images as will now be described.

As mentioned previously, at step 100 during processing of an input image to remove noise, the image is initially wavelet decomposed into wavelet detail spaces at different scales, with each wavelet detail space comprising a plurality of wavelet detail subbands. In this embodiment, as a Haar wavelet is employed, at level one (1) the image is initially decomposed into four (4) wavelet subbands, namely high-high (HH), high-low (HL), low-high (LH) and low-low (LL) subbands. The HH, HL and LH subbands represent the wavelet detail subbands at level one (1). The LL subband, which is the low frequency approximation, is then decomposed into HH, HL, LH and LL subbands at the next level two (2). The HH, HL and LH subbands represent the wavelet detail subbands at level two (2). The LL subband is then decomposed into HH, HL, LH and LL subbands at the next level three (3). This process continues until the $J_0$-th level is reached. The LL subband at this level represents the coarsest approximation of the image and is substantially noise free. As a result, at each level j, a wavelet detail space $W_j$ comprising wavelet detail subbands HH, HL and LH and expressed by $W_j = [W_j^{HH}, W_j^{HL}, W_j^{LH}]$ is generated.

At step 102, the feature energy space of the wavelet coefficients is determined. The j-th level wavelet coefficients in the wavelet detail subbands are expressed according to Equation (8) below as:

$$W_j(p) = [W_j^{HH}(p), W_j^{HL}(p), W_j^{LH}(p)] \qquad (8)$$

where:

$j = 1 \ldots J_0$;

p is a point at location (x,y) in the wavelet detail subband;

$x = 1 \ldots N$ $y = 1 \ldots M$; and

N and M are the width and height of the wavelet detail subbands at level j.

The single scale energy $SSE_j(p)$ of the wavelet coefficients for each location p in the wavelet detail subbands is calculated according to Equation (9) below:

$$SSE_j(p) = W_j(p) * W_j(p) = [W_j^{HH}(p)^2, W_j^{HL}(p)^2, W_j^{LH}(p)^2] \qquad (9)$$

The normalized inter-scale energy $NISE_j(p)$ of the wavelet coefficients is also calculated according to Equation (10) below:

$$NISE_j(p) = \min(|W_j(p)|, \alpha * |W_{j+1}(p)|) * \qquad (10)$$

$$W_j(p) = \begin{bmatrix} \min(|W_j^{HH}(p)|, \alpha * |W_{j+1}^{HH}(p)|) * W_j^{HH}(p), \\ \min(|W_j^{HL}(p)|\alpha * |W_{j+1}^{HL}(p)|) * W_j^{HL}(p), \\ \min(|W_j^{LH}(p)|, \alpha * |W_{j+1}^{LH}(p)|) * W_j^{LH}(p) \end{bmatrix}$$

where:

$\alpha$ is the normalization ratio between adjacent scales.

The normalized inter-scale energy term $\min(|W_j(p)|, \alpha*|W_{j+1}(p)|)$ in Equation (10) suppresses noise but keeps image details. This is due to the fact that the above normalized inter-scale energy term becomes $\min(|W_j(p)|, \alpha*|W_{j+1}(p)|) \approx |W_j(p)|/\sqrt{2}$ for noise but does not change for image details.

In addition to calculating the normalized inter-scale energy of the wavelet coefficients, the spatial relationship of noise and image detail is used to distinguish between image noise and image detail. Noise is spatially grainy while image details are spatially correlated and continuous. Accordingly, the weighted average single scale energy or "neighbor energy" of the wavelet coefficients is calculated according to Equation (11) below:

$$NeighborEnergy_j(p) = \frac{\sum_{l \in N(p)} SSE_j(l) * \text{weight}(l)}{\sum_{l \in N(p)} \text{weight}(l)} \quad (11)$$

where:
weight(l) is a weight function equal to one (1); and
N(p) is the neighborhood at location p.

Although in this embodiment, the weight function weight(l) is equal to one (1), those of skill in the art will appreciate that Gaussian or other weight functions based on edge direction etc. may be employed. The feature energy of the wavelet coefficients is calculated according to Equation (12) below:

$$FeatureEnergy_j(p) = \begin{cases} NISE_j(p) + NeighborEnergy_j(p) & j < J_0 \\ SSE_j(p) + NeighborEnergy_j(p) & j = J_0 \end{cases} \quad (12)$$

where:
$J_o$ is the highest scale of wavelet decomposition.

For the highest scale, the noise energy is very low and the single scale energy is good enough to distinguish between image noise and image detail.

Figure 7:
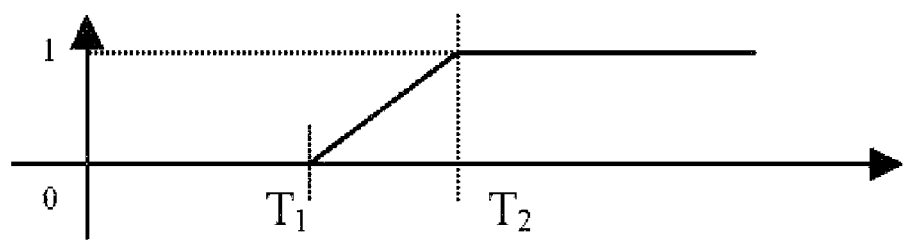
FIG. 7 shows an exemplary shrinkage function.

Once the feature energy space has been determined at step 102, a shrinkage ratio for each of the wavelet coefficients is calculated (step 104) according to Equation (13) below:

$$Shrinkage_j(p) = [Shrinkage_j^{HH}(p), Shrinkage_j^{HL}(p), Shrinkage_j^{LH}(p)] \quad (13)$$

where:

ISOsetting is the ISO value of the camera used to acquire image; and
NormalISO is the normal ISO setting of the camera.
FIG. 7 shows an exemplary shrinkage ratio.

With the shrinkage ratios calculated at step 104, the shrinkage ratios are then applied to the wavelet coefficients according to Equation (15) below:

$$ShrinkedW_j(p) = \quad (15)$$
$$W_j(p) * Shrinkage_j(p) = [W_j^{HH}(p) * Shrinkage_j^{HH}(p),$$
$$W_j^{HL}(p) * Shrinkage_j^{HL}(p), W_j^{LH}(p) * Shrinkage_j^{LH}(p)]$$

The modified or "shrunk" wavelet coefficients are then reconstructed to yield the noise reduced images at step 106.

The thresholds $TL_j$ and $TH_j$ used during calculation of the shrinkage ratios assist in distinguishing between image noise and image detail and to maintain a balance between removing noise and maintaining image detail. If the feature energy calculated for a wavelet coefficient is less than the threshold $TL_j$, the wavelet coefficient is deemed to represent noise. If the feature energy calculated for a wavelet coefficient is greater than the threshold $TH_j$, the wavelet coefficient is deemed to represent image detail. Noise images are used in this embodiment to select the thresholds $TL_j$ and $TH_j$ at each scale.

Figure 8I:
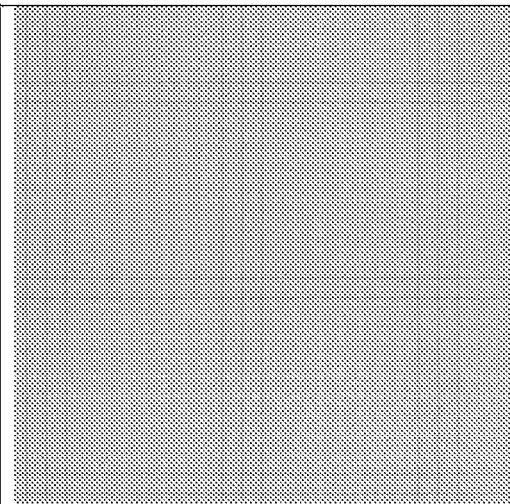
FIGS. 8A to 8N are noise images captured by a digital camera at different ISO settings.
Figure 8J:
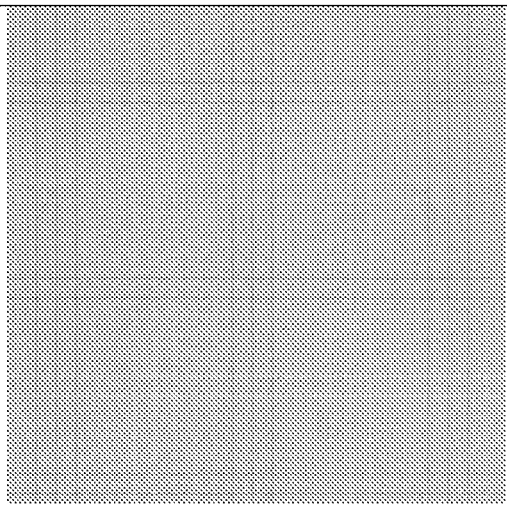
Figure 8K:
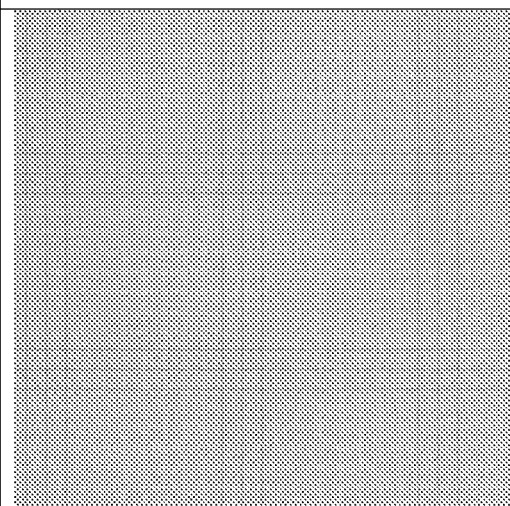
Figure 8L:
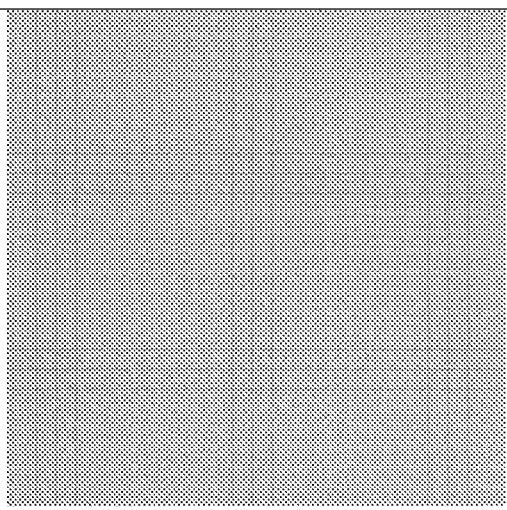
Figure 8M:
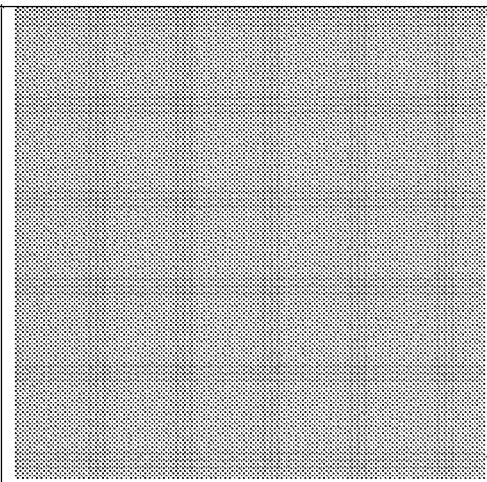
Figure 8N:
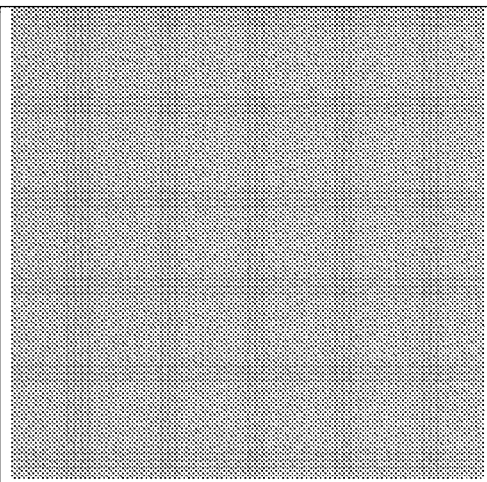

In particular, during determination of the thresholds $TL_j$ and $TH_j$, noise images at different ISO settings and a ⅓ EV stop were captured using a digital camera employing a digital camera board as shown in FIGS. 8A and 8N. A 256×256 pixel sub-window of each noise image was extracted and the sub-windows were wavelet decomposed as described above. For $$Shrinkage_j^{HH}(p) = \begin{cases} 1 & FeatureEnergy_j^{HH}(p) > K * TH_j^{HH} \\ \frac{(FeatureEnergy_j^{HH}(p) - K * TL_j^{HH})}{K * TH_j^{HH} - K * TL_j^{HH}} & \\ 0 & FeatureEnergy_j^{HH}(p) < K * TL_j^{HH} \end{cases}$$

$$Shrinkage_j^{HL}(p) = \begin{cases} 1 & FeatureEnergy_j^{HL}(p) > K * TH_j^{HL} \\ \frac{(FeatureEnergy_j^{HL}(p) - K * TL_j^{HL})}{K * TH_j^{HL} - K * TL_j^{HL}} & \\ 0 & FeatureEnergy_j^{HL}(p) < K * TL_j^{HL} \end{cases}$$

$$Shrinkage_j^{LH}(p) = \begin{cases} 1 & FeatureEnergy_j^{LH}(p) > K * TH_j^{LH} \\ \frac{(FeatureEnergy_j^{LH}(p) - K * TL_j^{LH})}{K * T_j^{LH} - K * T_j^{LH}} & \\ 0 & FeatureEnergy_j^{LH}(p) < K * TL_j^{LH} \end{cases}$$

$TL_j = [TL_j^{JJ}, TL_j^{HL}, TL_j^{LH}]$ and $TH_j = [TH_j^{HH}, TH_j^{HL}, TH_j^{LH}]$ are low and high noise profile thresholds for scale j; and K is a parameter that determines the level of noise reduction. The parameter K may be fixed or adjustable either manually or automatically. In this embodiment, the parameter K is expressed by Equation (14) below:

$$K = \log_2(ISOsetting/NormalISO)/2 \quad (14)$$

each sub-window, the feature energy of each wavelet coefficient was calculated according to Equation (16) below:

$$FeatureEnergy_j(p) = SSE_j(p) + NeighborEnergy_j(p) \quad (16)$$

The feature energy for each wavelet detail subband at each scale over all of the noise image sub-windows was then accumulated. For the HH subband at scale j, the noise energy level at 68% of accumulated feature energy was determined and used as threshold $TL_j^{HH}$. The noise energy level at 98% of the accumulated feature energy of the HH suband was also determined and used as threshold $TH_j^{HH}$. The thresholds $TL_j^{HL}$ $TL_j^{LH}$ $TH_j^{LH}$ and $TH_j^{LH}$ for the HL and LH subbands at scale j were obtained in a similar manner. The thresholds $TL_j$ and $TH_j$ for each scale were recorded and represent the noise profile of the image capture device for that scale. If desired, a histogram of the noise image feature energy at each scale may also be recorded to form a noise profile.

Figure 9A:
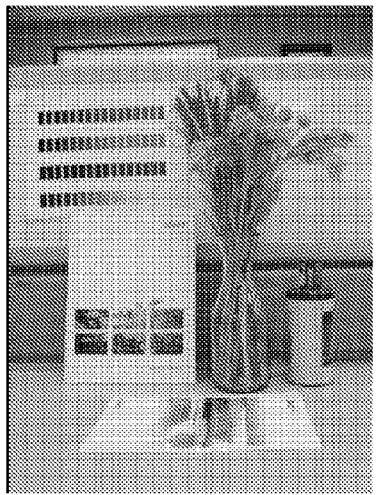
FIGS. 9A to 9H show digital images captured by a digital camera at different ISO settings and corresponding denoised images generated by the apparatus of FIG. 1.
Figure 9B:
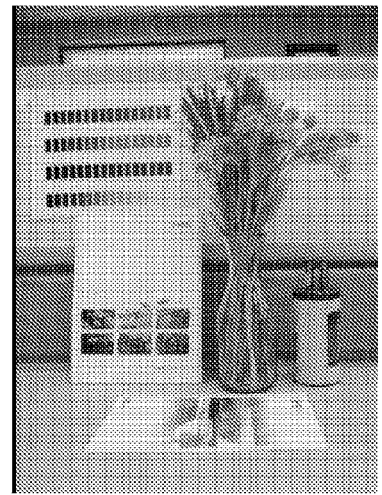
Figure 9C:
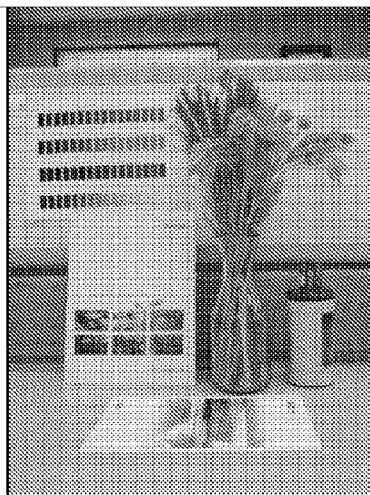
Figure 9D:
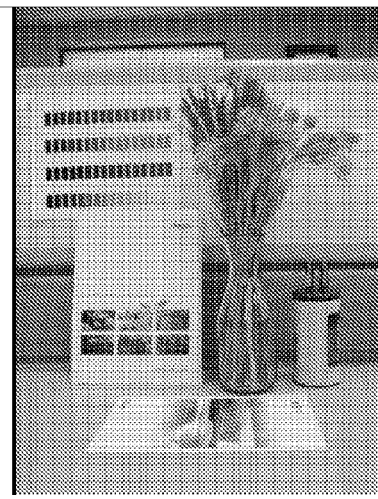
Figure 9E:
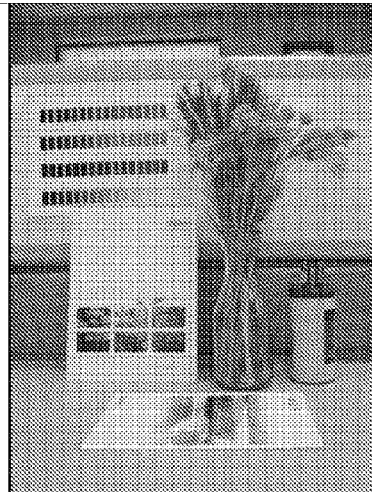
Figure 9F:
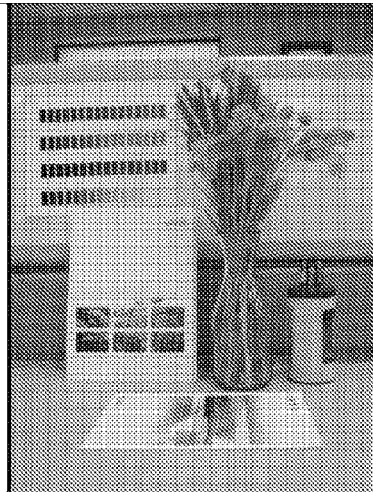
Figure 9G:
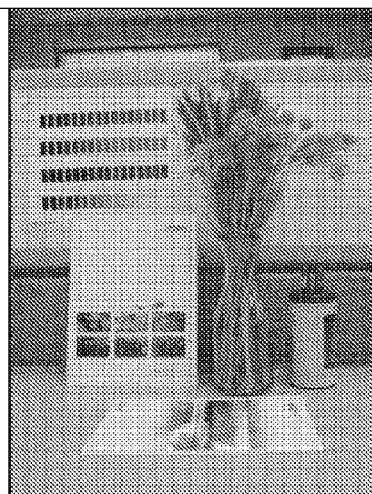
Figure 9H:

FIGS. 9A to 9H show digital images captured by a digital camera at different ISO settings and corresponding denoised images generated by the apparatus 40. In particular, FIG. 9A shows an image captured by a digital camera at an ISO setting equal to one-hundred (100) and FIG. 9B shows the corresponding denoised image. FIG. 9C shows an image captured by a digital camera at an ISO setting equal to two-hundred (200) and FIG. 9D shows the corresponding denoised image. FIG. 9E shows an image captured by a digital camera at an ISO setting equal to four-hundred (400) and FIG. 9F shows the corresponding denoised image. FIG. 9G shows an image captured by a digital camera at an ISO setting equal to six-hundred (600) and FIG. 9H shows the corresponding denoised image.

Figure 10A:
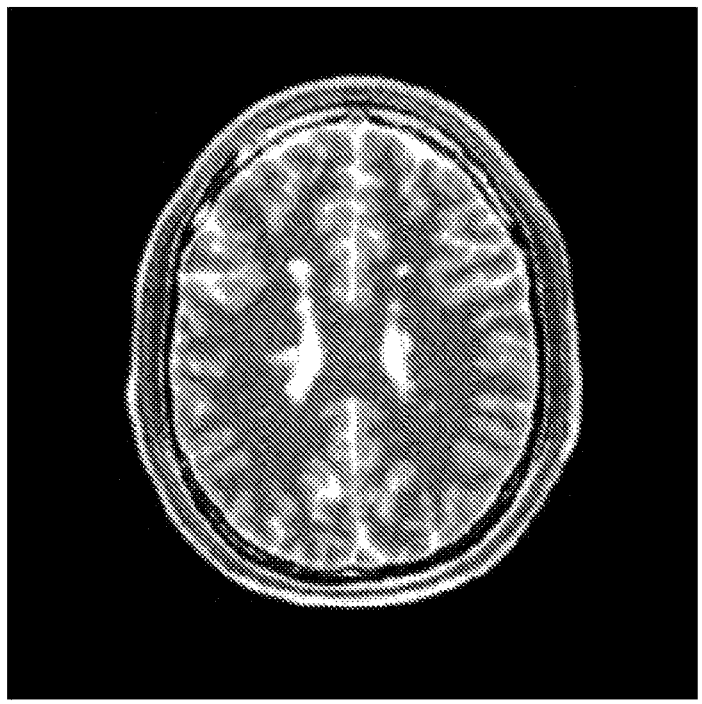
FIGS. 10A to 10C show another digital image captured by a digital camera and a corresponding denoised image generated by the apparatus of FIG. 1.
Figure 10B:
Figure 10C:
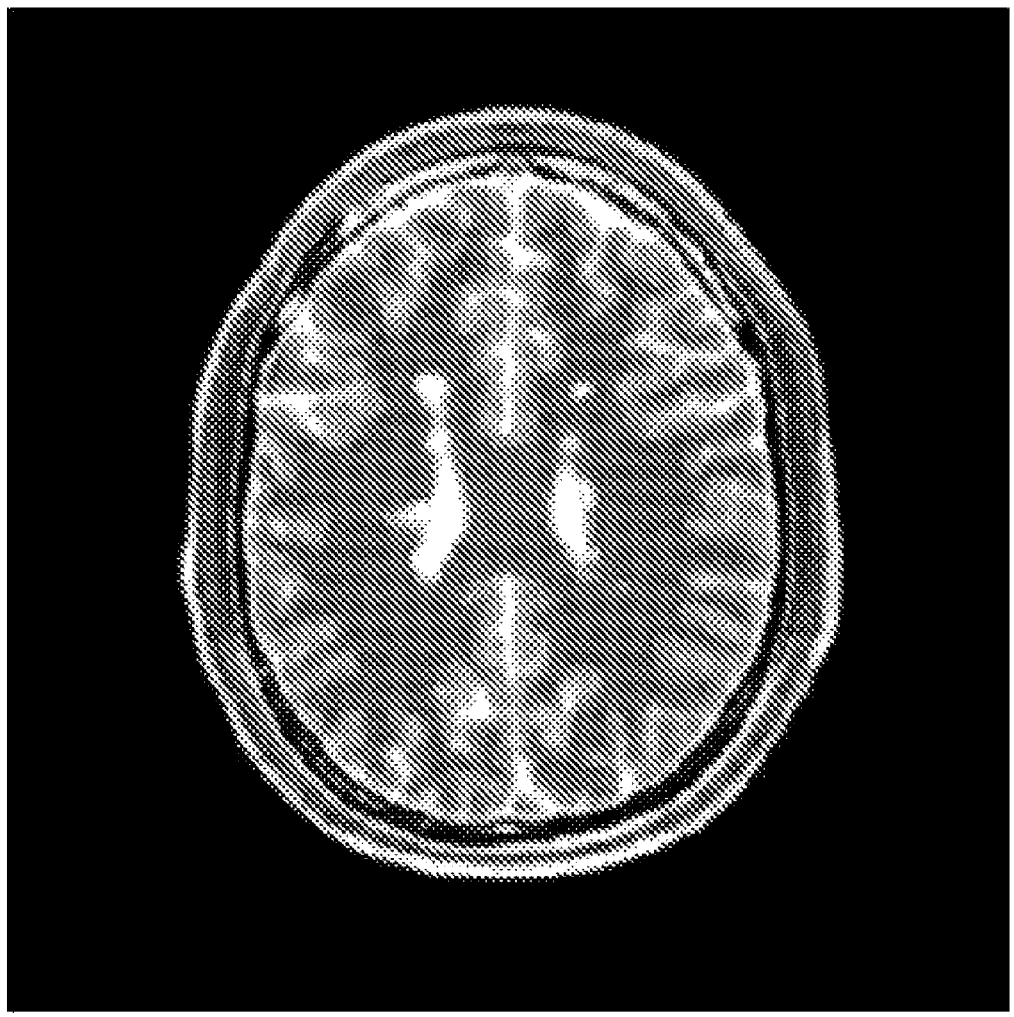

FIGS. 10A and 10C show another digital image captured by a digital camera and the corresponding denoised image generated by the apparatus 40. In this example, a sub-window of pixels in the image of FIG. 10A, as shown in FIG. 10B, is used to determine the thresholds $TL_j$ and $TH_j$.

In the above embodiment, the entire image is wavelet decomposed and then wavelet reconstructed following modification of the wavelet coefficients based on the energy of the wavelet coefficients. As the noise corruption in the red, green and blue channels is typically different, if desired each channel of the image can be processed separately. Often, in the red and blue channels, the noise level is higher. The Y channel of the image may be used to obtain prior possibilities for edges. Alternatively, when processing color images, the noise reducing technique may be performed only on the Y channel of the images in order to reduce the processing time.

Although use of a Haar wavelet is discussed above, those of skill in the art will appreciate that other wavelets such as for example Daubechies, Coiflets or Symmlet wavelets may be used.

The noise reducing technique is described above in a post-processing environment where images are processed downstream of the equipment used to capture the images. Those of skill in the art will however appreciate that the noise reducing technique may be employed in image capture devices such for example digital cameras, digital video recorders etc. to process and noise reduce images. This image denoising may be performed automatically prior to image display or in response to user input. Those of skill in the art will also appreciate that the noise reducing technique may be used to denoise images captured in a number of fields including for example, astronomy, medical imaging, radar imaging, natural photography etc.

The noise reducing application may run independently or may be incorporated into other available image processing applications to provide enhanced functionality to those applications. The software application may comprise program modules including routines, programs, object components, data structures etc. and be embodied as computer-readable program code stored on a computer-readable medium. The computer-readable medium is any data storage device that can store data, which can thereafter be read by a computer system. Examples of computer-readable medium include for example read-only memory, random-access memory, hard disk drives, magnetic tape, CD-ROMs and other optical data storage devices. The computer-readable program code can also be distributed over a network including coupled computer systems so that the computer-readable program code is stored and executed in a distributed fashion.

Although particular embodiments have been described, those of skill in the art will appreciate that variations and modifications may be made without departing from the spirit and scope thereof as defined by the appended claims.

What is claimed is:

1. A method of reducing noise in an image comprising:
    decomposing the image to generate wavelet coefficients at different scales;
    modifying the wavelet coefficients based on the energy of the wavelet coefficients at said different scales; and
    reconstructing the image based on the modified wavelet coefficients;
    wherein during the decomposing, said image is decomposed into wavelet detail spaces at different scales, each wavelet detail space comprising a plurality of wavelet detail subbands and each wavelet detail subband comprising a matrix of wavelet coefficients; and
    wherein during the modifying, the feature energy of the wavelet coefficients is determined according to:

$$FeatureEnergy_j(p) = \begin{cases} NISE_j(p) + NeighborEnergy_j(p) & j < J_0 \\ SSE_j(p) + NeighborEnergy_j(p) & j = J_0 \end{cases}$$

where $NISE_j(p)$ is the normalized inter-scale energy, $SSE_j(p)$ is the single scale energy, $NeighborEnergy_j(p)$ is the weighted average single scale energy, j is the scale and p is location (x,y) in each wavelet detail subband.

2. The method of claim 1 wherein said modifying is further based on an adjustable parameter.

3. The method of claim 2 wherein during said modifying each wavelet coefficient is multiplied by a shrinkage ratio of the form:

$$Shrinkage_j(p) = \begin{cases} 1 & FeatureEnergy_j(p) > K*TH_j \\ \dfrac{(FeatureEnergy_j(p) - K*TL_j)}{K*TH_j - K*TL_j} & \\ 0 & FeatureEnergy_j(p) < K*TL_j \end{cases}$$

where K is the adjustable parameter and $TH_j$ and $TL_j$ are thresholds for scale j.

4. The method of claim 3 wherein K is of the form:

$K = \log_2(ISOsetting/NormalISO)/2$ where ISOsetting is the ISO value of the image capture device used to capture the image and NormalISO is the typical ISO setting of the image capture device.

5. The method of claim 4 wherein said thresholds are determined by examining noise images captured at different ISO settings.

6. The method of claim 5 wherein said thresholds are based on the feature energy of wavelet coefficients of said noise images.

7. The method of claim 1 wherein said decomposing, modifying and reconstructing are performed independently on one or more channels of said image.

8. The method of claim 7 wherein said one or more channels comprises the Y channel of said image.

9. The method of claim 7 wherein said one or more channels comprises red and blue channels of said image.

10. The method of claim 1 wherein said decomposing, modifying and reconstructing are performed automatically upon image capture.

11. An apparatus for reducing noise in an image comprising:
    memory storing said image; and
    processing structure decomposing the image to generate wavelet coefficients at different scales, modifying the wavelet coefficients based on the energy of the wavelet coefficients at the different scales and reconstructing the image based on the modified wavelet coefficients;
    wherein said processing structure decomposes said image into wavelet detail spaces at different scales, each wavelet detail space comprising a plurality of wavelet detail subbands and each wavelet detail subband comprising a matrix of wavelet coefficient; and
    wherein during the modifying, said processing structure determines the feature energy of the wavelet coefficients according to:

$$FeatureEnergy_j(p) = \begin{cases} NISE_j(p) + NeighborEnergy_j(p) & j < J_0 \\ SSE_j(p) + NeighborEnergy_j(p) & j = J_0 \end{cases}$$

where $NISE_j(p)$ is the normalized inter-scale energy, $SSE_j(p)$ is the single scale energy, $NeighborEnergy_j(p)$ is the weighted average single scale energy, j is the scale and p is location (x,y) in each wavelet detail subband.

12. An apparatus according to claim 11 wherein the processing structure performs the decomposing, modifying and reconstructing independently on one or more channels of said image.

13. An apparatus according to claim 11 wherein the apparatus receives said image from an image capture device.

14. An apparatus according to claim 11 wherein the apparatus is embodied in an image capture device.

15. An apparatus according to claim 14 wherein said image capture device is a digital camera.

16. A non-transitory computer readable medium embodying a computer program for reducing noise in an image, said computer program comprising:
    computer program code for decomposing the image to generate wavelet coefficients at different scales;
    computer program code for modifying the wavelet coefficients based on the energy of the wavelet coefficients at different scales; and
    computer program code for reconstructing the image based on the modified wavelet coefficients;
    computer program code for decomposing said image into wavelet detail spaces at different scales, each wavelet detail space comprising a plurality of wavelet detail subbands and each wavelet detail subband comprising a matrix of wavelet coefficients; and
    computer program code for determining the feature energy of the wavelet coefficients according to:

$$FeatureEnergy_j(p) = \begin{cases} NISE_j(p) + NeighborEnergy_j(p) & j < J_0 \\ SSE_j(p) + NeighborEnergy_j(p) & j = J_0 \end{cases}$$

where $NISE_j(p)$ is the normalized inter-scale energy, $SSE_j(p)$ is the single scale energy, $NeighborEnergy_j(p)$ is the weighted average single scale energy, j is the scale and p is location (x,y) in each wavelet detail subband.

* * * * *

UNITED STATES PATENT AND TRADEMARK OFFICE
CERTIFICATE OF CORRECTION

PATENT NO. : 7,778,484 B2  Page 1 of 1
APPLICATION NO. : 11/620288
DATED : August 17, 2010
INVENTOR(S) : Guoyi Fu It is certified that error appears in the above-identified patent and that said Letters Patent is hereby corrected as shown below:

Column 13:

Line 8, please change "independentlyon" to --independently on--.

Signed and Sealed this

Ninth Day of November, 2010

David J. Kappos
*Director of the United States Patent and Trademark Office*